(12) United States Patent
Kawase et al.

(10) Patent No.: US 10,899,013 B2
(45) Date of Patent: Jan. 26, 2021

(54) ECCENTRICITY ERROR CORRECTION METHOD FOR ANGLE DETECTOR AND ROBOT SYSTEM

(71) Applicant: DENSO WAVE INCORPORATED, Aichi-pref. (JP)

(72) Inventors: Daisuke Kawase, Chita-gun (JP); Yuto Kawachi, Chita-gun (JP); Hiroaki Shiratori, Chita-gun (JP); Takafumi Fukuoka, Chita-gun (JP)

(73) Assignee: DENSO WAVE INCORPORATED, Aichi-pref. (JP)

( * ) Notice: Subject to any disclaimer, the term of this patent is extended or adjusted under 35 U.S.C. 154(b) by 272 days.

(21) Appl. No.: 16/034,031

(22) Filed: Jul. 12, 2018

(65) Prior Publication Data
US 2019/0022866 A1    Jan. 24, 2019

(30) Foreign Application Priority Data
Jul. 21, 2017 (JP) .................................. 2017-141877

(51) Int. Cl.
*B25J 9/16* (2006.01)

(52) U.S. Cl.
CPC .......... *B25J 9/1692* (2013.01); *B25J 9/1633* (2013.01); *B25J 9/1653* (2013.01); *G05B 2219/37515* (2013.01)

(58) Field of Classification Search
CPC ...... B25J 9/1633; B25J 9/1653; B25J 9/1692; G05B 2219/37515
See application file for complete search history.

(56) References Cited

U.S. PATENT DOCUMENTS

| | | | | |
|---|---|---|---|---|
| 4,722,063 A | * | 1/1988 | Yasukawa | B25J 9/1692 700/251 |
| 5,479,079 A | * | 12/1995 | Jeong | G01C 25/00 318/568.12 |
| 10,363,658 B2 | * | 7/2019 | Hasebe | G01D 5/24485 |
| 2015/0045952 A1 | * | 2/2015 | Kosaka | B25J 9/16 700/258 |
| 2015/0258685 A1 | * | 9/2015 | Matsumoto | B25J 9/1641 700/261 |
| 2015/0276436 A1 | | 10/2015 | Hasebe et al. | |
| 2016/0297069 A1 | * | 10/2016 | Negishi | B25J 9/1638 |
| 2017/0015004 A1 | * | 1/2017 | Osaka | B25J 13/089 |
| 2018/0085920 A1 | * | 3/2018 | Yamada | B25J 9/1635 |
| 2018/0361592 A1 | * | 12/2018 | Motoyoshi | B25J 17/0275 |
| 2020/0180154 A1 | * | 6/2020 | Tsuboi | B25J 17/02 |

\* cited by examiner

*Primary Examiner* — Robert T Nguyen
(74) *Attorney, Agent, or Firm* — Oliff PLC

(57) ABSTRACT

In an eccentricity error correction method for an angle detector, an output shaft angle is determined in at least three measurement positions. A difference between an arm angle value at each measurement position and the output shaft angle detected at each measurement position is determined as an eccentricity error. An error curve indicates a relationship between the arm angle value and the eccentricity error, and is determined as a function of the arm angle value by approximating the eccentricity error at each measurement position with a sine wave of which a single cycle is a single rotation of the arm. A correction formula that associates the output shaft angle and the arm angle value is determined using the error curve. A correction value corresponds to the detected output shaft angle, and is determined based on the correction formula and correcting the eccentricity error when the arm is rotated.

10 Claims, 9 Drawing Sheets

ECCENTRICITY ERROR CORRECTION METHOD FOR ANGLE DETECTOR AND ROBOT SYSTEM

CROSS-REFERENCE TO RELATED APPLICATION

This application is based on and claims the benefit of priority from Japanese Patent Application No. 2017-141877, filed Jul. 21, 2017. The entire disclosure of the above application is incorporated herein by reference.

BACKGROUND

Technical Field

The present disclosure relates to an eccentricity error correction method for an angle detector in which an error that occurs due to eccentricity in an angle detector provided in a robot is corrected, and a robot system.

Related Art

Conventionally, a joint angle of a robot is controlled through feedback of a detection angle that is detected by an angle detector, such as an optical encoder, that is attached to a motor. In addition, to improve positioning accuracy regarding an arm tip, an angle detector that directly reads a rotation angle of an arm that is connected by a transmission mechanism, such as a reducer, may be further attached. Hereafter, the angle detector that detects the rotation angle of the motor is referred to as an input-shaft angle detector. The angle detector that detects the rotation angle of the arm is referred to as an output-shaft angle detector.

The input-shaft angle detector determines the rotation angle of the arm in relation to a predetermined point of origin by dividing an input shaft angle by a reduction ratio of the reducer. Thus, the input-shaft angle detector detects the rotation angle of the arm at a high resolution corresponding to the reduction ratio. As a result, even in cases in which a resolution or accuracy of the input-shaft angle detector itself is relatively low, the input-shaft angle detector enables fine control.

Meanwhile, the output-shaft angle detector directly detects the rotation angle of the arm without being affected by displacement by an amount equivalent to backlash in the reducer, torsion caused by elastic deformation of the reducer, angle transmission error in the reducer, and the like.

Thus, in cases in which the input-shaft angle detector and the output-shaft angle detector are provided, a following combination is typically used. That is, taking into consideration resolution and detection accuracy, the input-shaft angle detector is mainly used for angular velocity control and the output-shaft angle detector is mainly used for angle control. As a result of a relative difference between the input shaft angle and an output shaft angle being detected as a torsion angle, the angle detectors may also be used for damping control and force control.

Thus, in cases in which a rotational center of the angle detector has shifted, that is, the angle detector is eccentric, a problem arises in that an error occurs in the detection angle detected by the angle detector. Hereafter, the error that occurs due to eccentricity in the angle detector is referred to as an eccentricity error. For example, JP-A-2015-194462 proposes that the eccentricity error be corrected based on the input shaft angles and the output shaft angles that are detected at periodic angles. Tip position accuracy is thereby improved.

However, in a joint portion of a robot, in addition to eccentricity in the angle detector, other factors that cause a difference between the input shaft angle and the output shaft angle are present. For example, the factors include backlash in the reducer and elastic deformation of the reducer caused by effects of an own arm weight. Therefore, accurate extraction of only the eccentricity error based on the input shaft angle and the output shaft angle is difficult. The eccentricity error cannot be properly corrected.

SUMMARY

It is thus desired to provide an eccentricity error correction method for an angle detector in which an eccentricity error that occurs due to eccentricity in the angle detector can be properly corrected, and a robot system.

An exemplary embodiment of the present disclosure provides an eccentricity error correction method for an angle detector, to correct an eccentricity error that occurs due to eccentricity in an output shaft angle detector in a robot that includes an input shaft angle detector and the output shaft angle detector, first, output shaft angles are detected in at least three measurement positions at which an effect of an own weight of an arm on a rotation direction is suppressed. In this case, the positions at which the effect of the own weight of the arm on the rotation direction is suppressed include a position at which the rotation direction is completely unaffected and a position at which the effect on the rotation direction is substantially negligible.

If the output shaft angle detector is not eccentric, the output shaft angle that is detected at each measurement position coincides with an arm angle value that indicates an actual rotation angle of the arm, because the effect of the own weight of the arm is suppressed. Meanwhile, if the output shaft angle detector is eccentric, the output shaft angle differs from the arm angle value. However, in cases in which the output shaft angle and the arm angle value differ, because the effect of the own weight of the arm is suppressed, the difference can be considered to be the eccentricity error that occurs due to the eccentricity in the output shaft angle detector.

Therefore, the difference between the arm angle value and the output shaft angle is determined as the eccentricity error at each measurement position. As a result, at least three combinations of the arm angle value and the eccentricity error can be acquired.

Here, when the output shaft angle detector is eccentric, a distance between a detection position of the output shaft angle detector and a rotational center of the arm changes in accompaniment with the rotation of the arm. Here, the detection position returns to the same position when the arm makes a single rotation. Thus, the eccentricity error that occurs due to the eccentricity in the output shaft angle detector forms a sine wave of which a single cycle is, too, a single rotation of the arm.

As a result of the eccentricity error at each measurement position being approximated by the sine wave of which a single cycle is a single rotation of the arm, an error curve that indicates a relationship between the arm angle value and the eccentricity error can be determined. When the error curve is used, if the eccentricity error is $\theta e$ and the arm angle value is $\theta a$, the eccentricity error can be simply expressed as below, using a function f of which the arm angle value is a variable.

$$\theta e = f(\theta a)$$

The determined error curve indicates the relationship between the arm angle value and the eccentricity error. Therefore, to correct the eccentricity error during operation of the robot, the arm angle value is required to be determined from the input shaft angle or the output shaft angle that can be detected during operation.

At this time, at positions other than the above-described measurement positions, error factors such as backlash, elastic deformation, and an angular transmission error in a reducer are present. Thus, if the arm angle value is determined from the input shaft angle detected by the input shaft angle detector, the arm angle value may include errors caused by the above-described error factors. An error occurs in the correction value that is ultimately determined.

Meanwhile, as described above, the output shaft angle detected by the output shaft angle detector is not affected by the error factors such as backlash, elastic deformation, and the angular transmission error in the reducer. Thus, the arm angle value is preferably determined from the output shaft angle. At this time, the output shaft angle is detected as a sum of the arm angle value and the eccentricity error. There, the relationship thereof is expressed as below.

output shaft angle=arm angle value+eccentricity error

In addition, from the two relationships described above, a correction formula that indicates a corresponding relationship between the output shaft angle and the arm angle value can be determined as below.

output shaft angle=arm angle value($\theta a$)+$f(\theta a)$

That is, from the output shaft angle detected during operation of the robot, the arm angle value corresponding to the output shaft angle can be determined. Then, when the arm angle value corresponding to the output shaft angle is determined, extraction of only the eccentricity error corresponding to the output shaft angle can be performed based on the above-described error curve. The eccentricity error can be corrected.

As a result of the output shaft angle being detected at each measurement position, and the error curve being determined with the difference between the arm angle value and the output shaft angle at each measurement position as the eccentricity error, as described above, the eccentricity error corresponding to the arm angle value can be accurately extracted in a state in which errors such as backlash, elastic deformation, and the angular transmission error in reducer are not included.

In addition, as a result of the correction formula associating the output shaft angle and the arm angle value being determined using the error curve, the arm angle value can be determined from the output shaft angle that can be detected during operation. When the arm angle value is determined, the correction value for correcting the eccentricity error corresponding to the arm angle value, that is, the eccentricity error included in the output shaft angle can be accurately determined. Thus, the eccentricity error that occurs due to eccentricity in the output shaft angle detector can be properly corrected.

In addition, the robot system of the present disclosure includes a control unit that performs the above-described processes. Thus, the robot system can properly correct the eccentricity error that occurs due to eccentricity in the angle detector.

For correct determination of the correction value, it is important that the eccentricity error be measured at an attitude at which the effect of the own weight of the arm is suppressed. At this time, if positions of stoppers are minutely changed, the attitudes at which the weight of the own arm has no effect are theoretically limitless. However, an actual robot is not configured to enable such minute changes. Therefore, the attitudes at which the own weight of the arm has no effect are realistically limited.

Thus, if focus is placed on the eccentricity error exhibiting changes that approximate a sine wave, as a result of the eccentricity errors being determined at three attitudes at which the effect of the own weight of the arm is considered suppressed, the error curve can be generated based on the characteristic that the eccentricity error exhibits changes that approximate a sine wave. Therefore, the method of the present disclosure is suitable for application to an actual robot.

In addition, it is also important that the subject of eccentricity error correction is the output shaft angle detector. Whether or not the output shaft angle detector is eccentric can be confirmed after assembly of the robot is completed. That is, the eccentricity error in the output shaft angle detector can be determined after assembly of the robot is completed, or in other words, after the joint in the robot is in a state of receiving the own weight of the arm.

In this case, making adjustments with the robot arm laid on a floor, for example, such that the own weight of the arm is not applied cannot be realistically performed at a manufacturing site, in light of the robot being a relatively heavy object and the risk of damage to the robot.

In this regard, in the method of the present disclosure, the error curve can be determined and the correction value can be determined regarding the robot of which assembly has been completed. Therefore, there is an advantage in that the method can be realistically used at a manufacturing site of the robot. In addition, the error curve can be determined and the correction value can be determined at the installation site of the robot, as well. Therefore, the method of the present disclosure is very effective.

In the present disclosure, a contact position at which the arm comes into contact with a stopper from above may be set as at least one of the measurement positions. The stopper mechanically restricts the rotation of the arm. The stopper is mechanically attached to the robot. Therefore, the position of the stopper is fixed. A mechanical positional relationship of the stopper to the rotational center of the arm is also prescribed. In addition, at the contact position, the stopper supports the own weight on the arm side. Therefore, the own weight on the arm side does not cause an error in the detection angle.

As a result, when the arm is at the contact position, the arm angle value can be mechanically identified by the position of the stopper, outer dimensions of the arm and the like. Therefore, as a result of the contact position being set as the measurement position, extraction of only the eccentricity error caused by eccentricity in the output shaft angle detector can be performed.

In the present disclosure, a vertical position may be set as at least one of the measurement positions. The vertical position is a position at which the center of gravity on the arm side is positioned within a predetermined angular range that includes a vertically upward direction from the rotational center of the arm. When the arm is positioned at the vertical position, force is not applied in the rotation direction in the reducer. Therefore, the reducer is considered to be in a state in which elastic deformation does not occur, or is negligible because the force applied in the rotation direction is minimal.

Thus, at the vertical position, the input shaft angle and the output shaft angle are considered to substantially coincide. In this case, it is thought that the arm angle value can be determined with high accuracy from the detected input shaft angle.

Therefore, as a result of the vertical position being set as the measurement position, extraction of only the eccentricity error caused by eccentricity in the output shaft angle detector can be performed. In addition, at the vertical position, for example, because the arm is oriented in the substantially vertical direction when the arm is extended straight, the arm angle value can also be mechanically identified.

In the present disclosure, an average value of the output shaft angle at the vertical position detected when the arm is forward-rotated and the output shaft angle at the vertical position detected when the arm is reverse-rotated at a same speed as the forward rotation may be set as the output shaft angle at the vertical position.

When a motor is controlled and the arm is forward-rotated and reverse-rotated at a fixed speed, the output shaft rotates so as to be pulled by the input shaft. Therefore, torsion occurs between the output shaft and the input shaft. A difference may occur between the output shaft angle that is detected when the arm is forward-rotated and the output shaft angle that is detected when the arm is reverse-rotated.

Meanwhile, when the arm is rotated at the same speed, torsion of the same magnitude occurs during the forward rotation and the reverse rotation. As a result of the average of the output shaft angles during the forward rotation and the reverse rotation being set as the output shaft angle, the correction value can be determined based on the output shaft angle from which the effect of torsion is eliminated. Accuracy of the correction value can be improved.

In the present disclosure, a forward-rotation approximation line that approximates a relationship between a plurality of input shaft angles and output shaft angles detected when the arm is forward-rotated and a reverse-rotation approximation line that approximates a relationship between a plurality of input shaft angles and output shaft angles detected when the arm is reverse-rotated at a same speed as the forward rotation may be determined. An average value of an output shaft angle at the vertical position determined from the forward-rotation approximation line and an output shaft angle at the vertical position determined from the reverse-rotation approximation line may be set as the output shaft angle at the vertical position.

For example, when strain wave gearing is used as the reducer, an angular transmission error may occur in the detection value of the angle detector. The angular transmission error is caused by the output shaft angle determined from the input shaft angle differing from a theoretical value. Thus, when correction is performed using an output shaft angle that has been detected once at the vertical position, the angular transmission error is included.

Therefore, as a result of the average value of the output shaft angle determined from the forward rotation approximation line and the output shaft angle determined from the reverse rotation approximation line being set as the output shaft angle at the vertical position, the output shaft angle can be determined in a state in which the effect of the angular transmission error is suppressed. Accuracy of the correction value can be improved.

In the present disclosure, a predetermined detection area of which a center is vertically above the rotational center of the arm may be set. After the arm is temporarily rotated to either of an upper limit and a lower limit of the detection range, a process for detecting the output shaft angle at each predetermined angle while rotating the arm from the upper limit to the lower limit and a process for detecting the output shaft angle at each predetermined angle while rotating the arm from the lower limit to the upper limit may be performed the same number of times. An average value of the plurality of output shaft angles detected in the processes may be set as the output shaft angle at the vertical position.

For example, when the strain wave gearing is used as the reducer, the above-described angular transmission error may be included in the detection value of the angle detector. Therefore, a plurality of output shaft angles are detected between the upper limit and the lower limit of the detection range by the arm being forward-rotated and reverse-rotated.

In this case, the detection range is set such that the center thereof is vertically above the rotational center of the arm. In addition, the arm is forward-rotated and reverse-rotated. Therefore, an overall average of the plurality of detected output shaft angles can be used as the output shaft angle at the vertical position. In addition, because the output shaft angle can be determined in a state in which the effect of the angular transmission error is suppressed, accuracy of the correction value can be improved.

In the present disclosure, when the arm angle value is determined from the output shaft angle using the correction formula, the function of the arm angle value included in the correction formula may be approximated by an arm angle that is obtained by the input shaft angle being divided by the reduction ratio of the reducer.

The above-described correction formula is a non-linear formula expressed as a sum of the arm angle value ($\theta a$) and the function f($\theta a$). Determining the arm angle value from the detected output shaft angle is difficult. In addition, calculation load may increase and calculation time may increase.

Therefore, the correction formula is simplified by the arm angle value ($\theta a$) being substituted with the arm angle ($\theta ai$), regarding the function f. In an actual robot, the difference between the arm angle value ($\theta a$) and the arm angle ($\theta ai$) is assumed to be very small. Therefore, even when the arm angle value ($\theta a$) is substituted with the arm angle ($\theta ai$), it is thought that the accuracy is of an extent similar to that when the arm angle value ($\theta a$) is used.

In addition, as a result of substitution with the arm angle ($\theta ai$), calculation load can be significantly reduced. As a result, even when the calculation is performed using the correction formula during operation of the robot, the arm angle value and the correction value can be easily determined without causing delays that affect control.

DESCRIPTION OF THE EMBODIMENTS

A plurality of embodiments will hereinafter be described with reference to the drawings. Sections among the plurality of embodiments that are essentially identical are described using the same reference numbers.

First Embodiment

A first embodiment will be described below with reference to FIG. 1 to FIG. 7.

Figure 1:
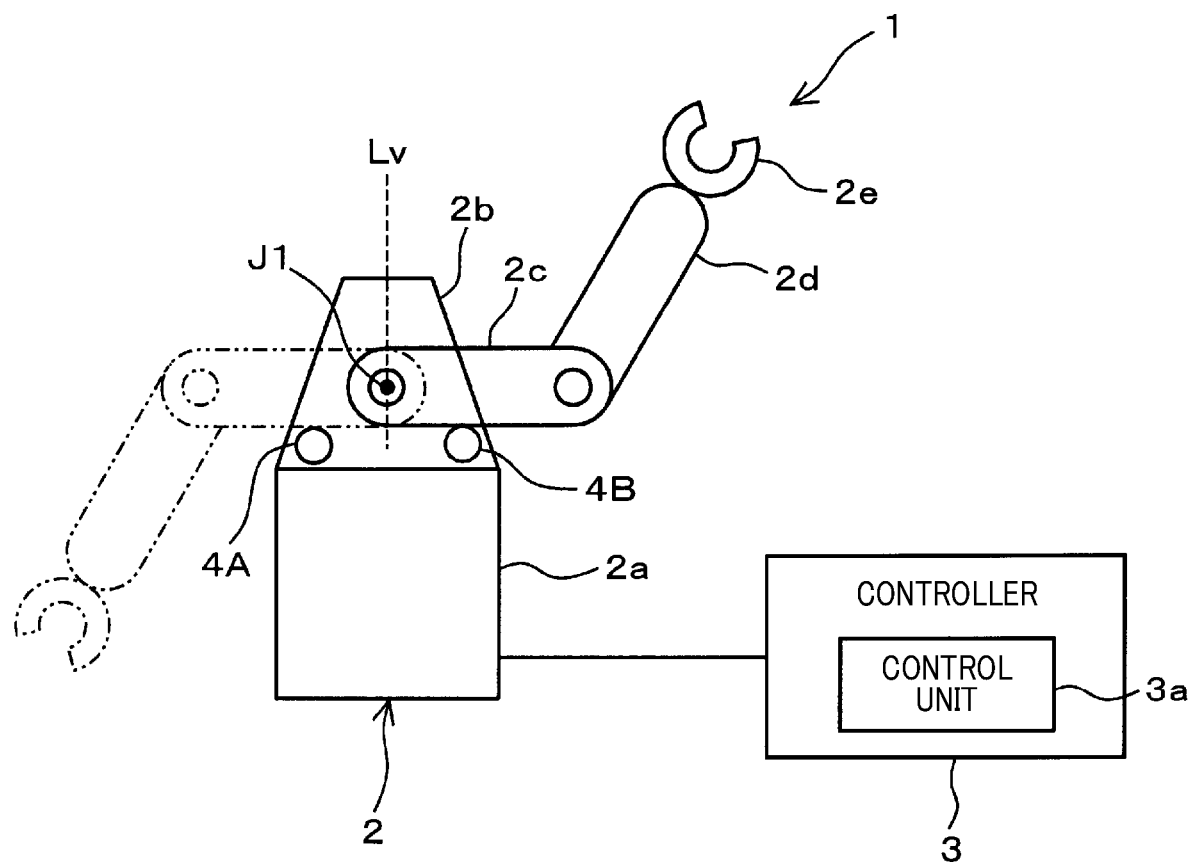
FIG. 1 is a diagram schematically showing a configuration of a robot system according to a first embodiment.

As shown in FIG. 1, a robot system 1 according to the present embodiment includes a so-called vertically articulated robot 2 and a controller 3 that controls the robot 2.

In the robot 2, a shoulder 2b is connected onto a base 2a so as to be rotatable in a horizontal direction, via a rotation shaft that is set in a vertical direction. One end of a first arm 2c is connected to the shoulder 2b so as to be rotatable in a perpendicular direction, via a rotation shaft that is set in a horizontal direction. One end of a second arm 2d is connected to the other end side of the first arm 2c so as to be rotatable in the perpendicular direction, via a rotation shaft that is set in the horizontal direction. A tool 2e is connected to the other end side of the second arm 2d. The tool 2e rotates relative to the second arm 2d.

In addition, the robot 2 is provided with a stopper 4. For example, the stopper 4 mechanically restricts a range of movement of the first arm 2c. The stopper 4 is also referred to as a mechanical end.

According to the present embodiment, the robot 2 is provided with a first stopper 4A and a second stopper 4B. The first stopper 4A restricts the range of movement when the first arm 2c is rotated in a counter-clockwise direction in FIG. 1. The second stopper 4B restricts the range of movement when the first arm 2c is rotated in a clockwise direction in FIG. 1.

The stoppers 4 are provided in attachment holes (see FIG. 10) in a fixed or removable manner. Hereafter, rotation in the clockwise direction in FIG. 1 is referred to as forward rotation. Rotation in the counter-clockwise direction in FIG. 1 is referred to as reverse rotation.

The first stopper 4A is provided in a position further towards the reverse rotation side than a vertical line (Lv). The vertical line (Lv) indicates a vertically upward direction from a rotational center (J1) of the first arm 2c. In a state in which the first arm 2c is in contact with the first stopper, the first stopper 4A supports the first arm 2c from below. In other words, the first arm 2c comes into contact with the first stopper 4A from above.

In addition, in the state in which the first arm 2c is in contact with the first stopper 4A, the first stopper 4A supports the weight of the first arm 2c side, that is, the weight of the tip end side of the robot 2 including the first arm 2c. Hereafter, the weight applied to a joint portion of the robot 2, such as the weight of the first arm 2c side, is referred to as an own arm weight for convenience.

The second stopper 4B is provided in a position further towards the forward rotation side than the vertical line (Lv).

In a state in which the first arm 2c is in contact with the second stopper 4B, the second stopper 4B supports the first arm 2c from below. In other words, the first arm 2c comes into contact with the second stopper 4B from above. In addition, in the state in which the first arm 2c is in contact with the second stopper 4B, the second stopper 4B supports the own arm weight.

Figure 2:
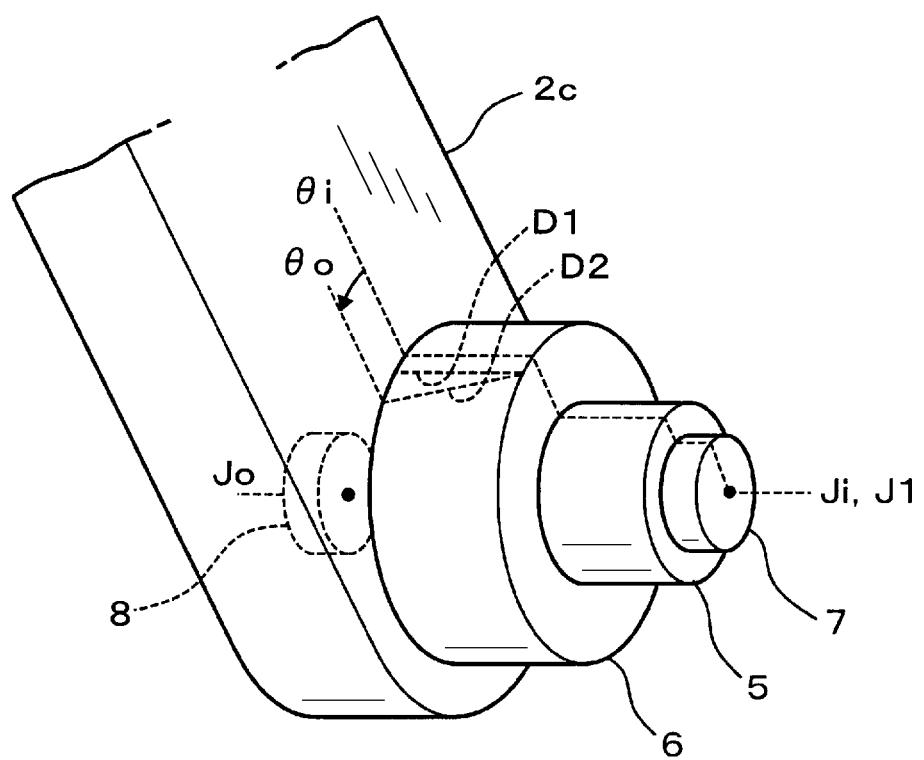
FIG. 2 is a diagram schematically showing an overview of a joint portion of a robot.

Here, as shown in FIG. 2, for example, in a joint portion that connects the shoulder 2b and the first arm 2c, the robot 2 includes a motor 5, a reducer 6, an input-shaft angle detector 7, an output-shaft angle detector 8, and the like. The motor 5 drives the first arm 2c. The reducer 6 is connected to an output shaft of the motor 5 and functions as a transmission mechanism. The input-shaft angle detector 7 detects a rotation angle of the motor 5. The output-shaft angle detector 8 detects a rotation angle of the first arm 2c.

For example, the motor 5 is configured by a stepper motor. According to the present embodiment, the reducer 6 is configured by strain wave gearing.

The input-shaft angle detector 7 and the output-shaft angle detector 8 are each configured by a known encoder that has a rotating disk and an optical detector. Hereafter, a detection value of the input-shaft angle detector 7 is referred to as an input shaft angle. A detection value of the output-shaft angle detector 8 is referred to as an output shaft angle. Furthermore, the input shaft angle and the output shaft angle are also collectively referred to a detection angle. Regarding the detection angle, a positive direction is the forward rotation direction of the arm.

In this case, when a rotational center of the input-shaft angle detector 7 is Ji and a rotational center of the output-shaft angle detector 8 is Jo, in the case of the first arm 2c, the rotational center (Ji) of the input-shaft angle detector 7, or more strictly speaking, a rotational center of an output shaft of the reducer 6 is the rotational center (J1) of the first arm 2c. A difference in position between the rotational center (J1) of the first arm 2c and the rotational center (Jo) of the output-shaft angle detector 8 corresponds to an eccentricity in the output-shaft angle detector 8.

The controller 3 has a control unit 3a (not shown) that is composed of a microcomputer and the like. The controller 3 controls the attitude and operations of the robot 2. For example, the control unit 3a drives the motor 5 of each joint portion and controls the attitude of the robot 2 through feedback of the input shaft angle detected by the input-shaft angle detector 7 attached to the motor 5.

In addition, the control unit 3a drives the tool 2e and controls operations such as grasping of a workpiece. Furthermore, as described hereafter, the control unit 3a performs a process for correcting an error attributed to shifting of the rotational center of the output-shaft angle detector 8, that is, the eccentricity error that occurs due to eccentricity in the output-shaft angle detector 8.

Next, workings of the configuration described above will be described.

As described above, when the positions of the rotational center of the angle detector and the rotational center of the arm differ and the angle detector is eccentric, a problem arises in that an error occurs in the detection angle detected by the angle detector. It is thought that, if the eccentricity error in the output-shaft angle detector 8 can be corrected at this time, detection accuracy regarding the rotation angle of the arm can be improved It is thought that, if no error factors are present at this time, the rotation angle of the arm can be detected based on the input shaft angle. However, in the case of the angle detector provided in the joint portion of the robot 2, in addition to the eccentricity error, other factors that cause an error between the input shaft angle and an arm angle value are present. The arm angle value indicates an actual rotation angle of the arm.

Specifically, as shown in FIG. 2, in the joint portion of the robot 2, a discrepancy (D1) of an amount equivalent to backlash and a discrepancy (D2) of an amount equivalent to elastic deformation may occur in relation to the input shaft angle ($\theta i$). In FIG. 2, the discrepancies are intentionally enlarged for ease of description.

Of the discrepancies, the discrepancy of an amount equivalent to elastic deformation occurs as a result of the own arm weight affecting the rotation direction. Thus, the magnitude of the discrepancy changes based on the attitude of the robot 2, that is, the rotation angle of the arm. As a result, the actual rotation angle of the arm cannot be simply determined based on the input shaft angle ($\theta i$). Accurate extraction of only the eccentricity error from the torsion angle that is the difference between the input shaft angle ($\theta i$) and the output shaft angle ($\theta i$) is difficult.

In this case, to suppress the effect of the own arm weight, a method in which eccentricity in the joint portion is measured at a stage before assembly of the robot 2 can be considered. However, it is difficult to consider such a method practical, taking into consideration the following. That is, for example, the eccentricity itself may shift as a result of assembly error because the output-shaft angle detector 8 is attached to the arm side. In addition, performing assembly such that assembly errors do not occur is difficult and may result in significant decrease in productivity.

A method in which the effect of the own arm weight is estimated and corrected based on design characteristics, such as rigidity of the reducer 6 and rigidity of the arm, can also be considered. However, in such a method, the design characteristics may differ from actual characteristics. In addition, identifying the characteristics for each individual reducer 6 is difficult. Therefore, it is thought that the correction value may include an error and accurate correction is difficult.

Furthermore, it is also important that the subject of eccentricity error correction is the output-shaft angle detector 8. Whether or not the output-shaft angle detector 8 is eccentric can be confirmed after assembly of the robot 2 is completed. That is, the eccentricity error in the output-shaft angle detector 8 can be determined after assembly of the robot 2 is completed, or in other words, after the joint in the robot 2 is in a state of receiving the own arm weight. In this case, making adjustments with the robot arm laid on a floor, for example, such that the own arm weight is not applied cannot be realistically performed at a manufacturing site, in light of the robot 2 being a relatively heavy object and the risk of damage to the robot 2.

Therefore, according to the present embodiment, the eccentricity error caused by eccentricity in the output-shaft angle detector 8 is properly corrected in a following manner. Hereafter, an example in which the eccentricity error in the output-shaft angle detector 8 provided in the first arm 2c is corrected will be described.

However, correction can be performed in other arms as well, based on a similar idea. In addition, regarding the input-shaft angle detector 7, adjustments are assumed to have already been performed. For example, the adjustments include correction of eccentricity and the like, and alignment of origin. Here, regarding the adjustments in the input-shaft angle detector 7, correction of eccentricity can generally be performed with individual motors 5. The positioning of the point of origin can be performed by the arm being placed in contact with the stopper 4 or the like.

Figure 3:
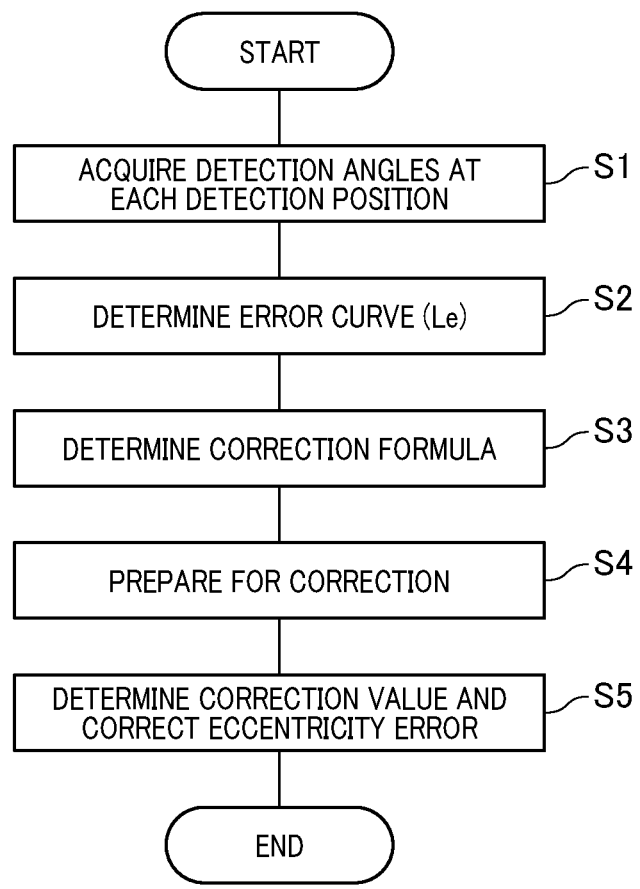
FIG. 3 is a flowchart of a process for correcting eccentricity error.

FIG. 3 shows an overall flow of processes in an eccentricity error correction method according to the present embodiment. Hereafter, the first arm 2c is described as an example. In addition, according to the present embodiment, the control unit 3a of the controller 3 performs the processes described below.

Although described in detail hereafter, steps S1 to S3 in FIG. 3 are processes that are performed during a non-operating period during which the robot 2 is not performing an actual operation. For example, the non-operating period is when a teaching operation is being performed. Step S4 is a process that can be performed during the non-operating period or an operating period during which the robot 2 is performing an actual operation. Step S5 is a process that is performed during the operating period. In addition, step S4 can be omitted.

First, the controller 3 acquires the detection angles, that is, the input shaft angle and the output shaft angle at each measurement position (step S1). According to the present embodiment, at least three positions including a position at which the own arm weight does not affect the rotation direction are set as the measurement positions. In this case, the position at which the own arm weight does not affect the rotation direction also includes a position at which the rotation direction is completely unaffected and a position at which the effect on the rotation direction is considered substantially negligible.

According to the present embodiment, a total of three positions are set as the measurement positions. That is, two contact positions at which the first arm 2c comes into contact with the stoppers 4, and a single vertical position at which a center of gravity of the own arm weight is positioned within a predetermined range that includes a vertically upward direction from the rotational center are set.

Among the measurement positions, the contact positions are a position (Pm1; see FIG. 6) at which the first arm 2c comes into contact with the first stopper 4A from above and a position (Pm2; see FIG. 6) at which the first arm 2c comes into contact with the second stopper 4B from above. At this time, when the first arm 2c is rotated to the contact position, the first arm 2c can be rotated by the motor 5 being driven. Alternatively, a worker can manually rotate the first arm 2c.

The positions of the stoppers 4 are mechanically prescribed. Therefore, the contact position is a position at which the rotation angle in the state in which the first arm 2c is in contact with the stopper 4, that is, the arm angle value at the contact position can be identified based on mechanical design values of the robot 2. In addition, the stopper 4 supports the own arm weight at the contact position. Therefore, the own weight on the arm side does not cause an error on the output shaft side. As a result, the contact position can be considered to be a position at which extraction of only the eccentricity error attributed to eccentricity in the output-shaft angle detector 8 can be performed. In addition, the contact position corresponds to a position at which the rotation angle of the arm can be estimated based on the mechanical design values and a position at which the own arm weight does not affect the rotation direction.

Figure 4:
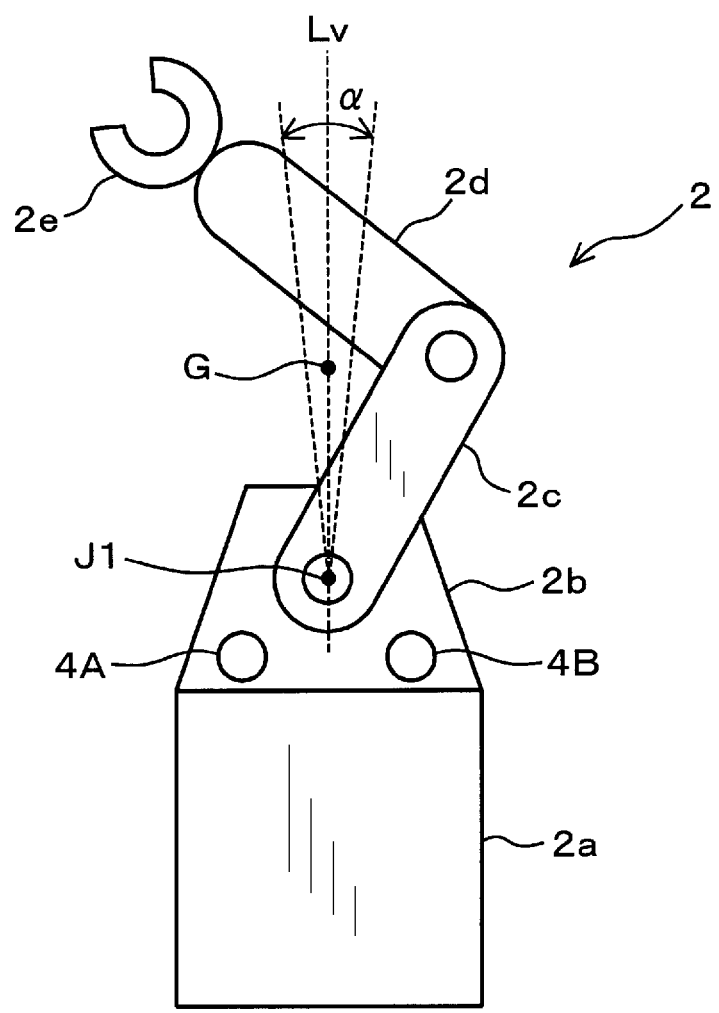
FIG. 4 is a diagram schematically showing a vertical position.

Meanwhile, for example, when the arm subject to correction is the first arm 2c, as shown in FIG. 4, the vertical position is a position (Pg; see FIG. 6) at which a center of gravity (G) on the first arm 2c side is on the vertical line (Lv) or within a predetermined angular range ($\alpha$) that includes the vertical line (Lv).

At this time, the center of gravity (G) of the robot 2 can be roughly identified based on the attitude of the robot 2. Alternatively, for example, if each arm is extended straight or the like, the worker may visually roughly ascertain the center of gravity (G). In addition, when the center of gravity (G) is moved to the vertical position, control can be performed such that the center of gravity (G) reaches the vertical position by the motor 5 being driven based on feedback of the input shaft angle. Alternatively, if the center of gravity (G) is ascertained, the worker can visually set the center of gravity (G) to be substantially positioned in the vertical position by manually rotating the first arm 2c.

In addition, the angular range (α) is set as a range within which the discrepancies of an amount equivalent to elastic deformation are considered to be approximately equal. When control is performed by the motor 5 being driven, the angular range (α) can be set with reference to the input shaft angle.

Alternatively, in cases in which the worker manually rotates the first arm 2c, the angular range (α) can be visually set such that the center of gravity (G) is vertically above the rotational center (J) of the first arm 2c. That is, the vertical position corresponds to a position at which the own arm weight does not affect the rotation direction and a position at which the rotation direction is expected to be substantially unaffected by the own arm weight.

Here, at the vertical position, although force in a vertically downward direction is applied to the reducer 6, force in the rotation direction is expected to not be applied or to be negligible. Therefore, displacement by an amount equivalent to elastic deformation does not occur in the reducer 6.

However, at the vertical position, unlike the contact position, other factors that affect the output shaft angle are present. When the motor 5 is controlled and the arm is forward-rotated or reverse-rotated at a fixed speed, the output shaft rotates so as to be pulled by the input shaft. Therefore, torsion occurs between the output shaft side and the input shaft side.

As a result, a discrepancy occurs between the output shaft angle that is detected when the arm is forward-rotated and the output shaft angle that is detected when the arm is reverse-rotated.

Figure 5:
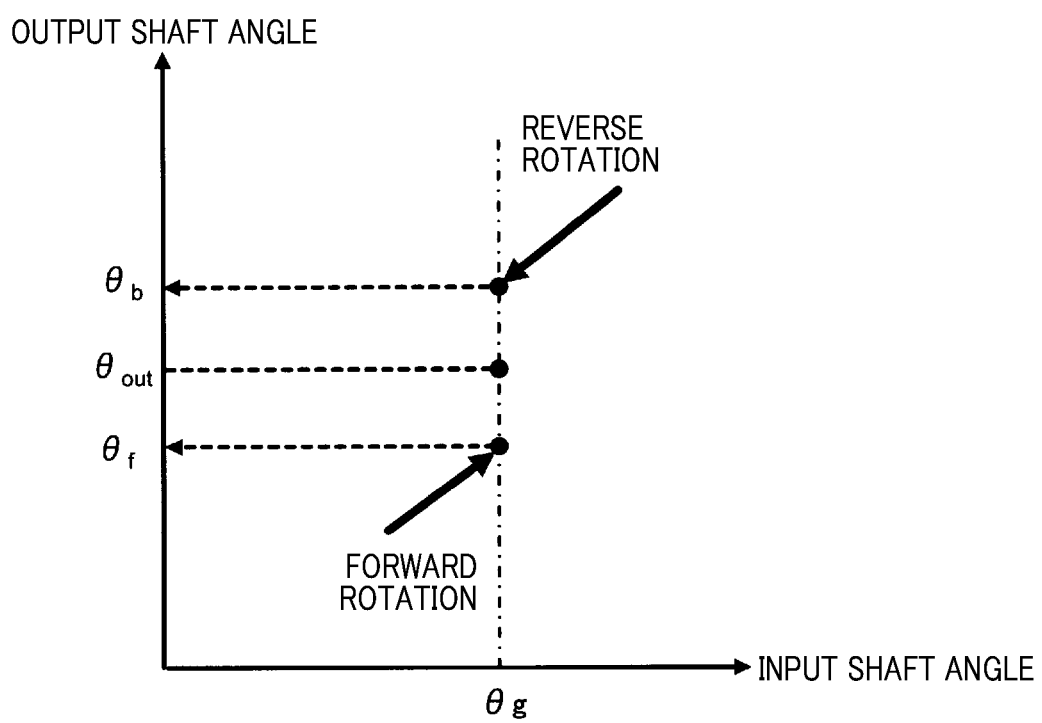
FIG. 5 is a diagram schematically showing discrepancies in an output shaft angle at the vertical position.
Figure 6:
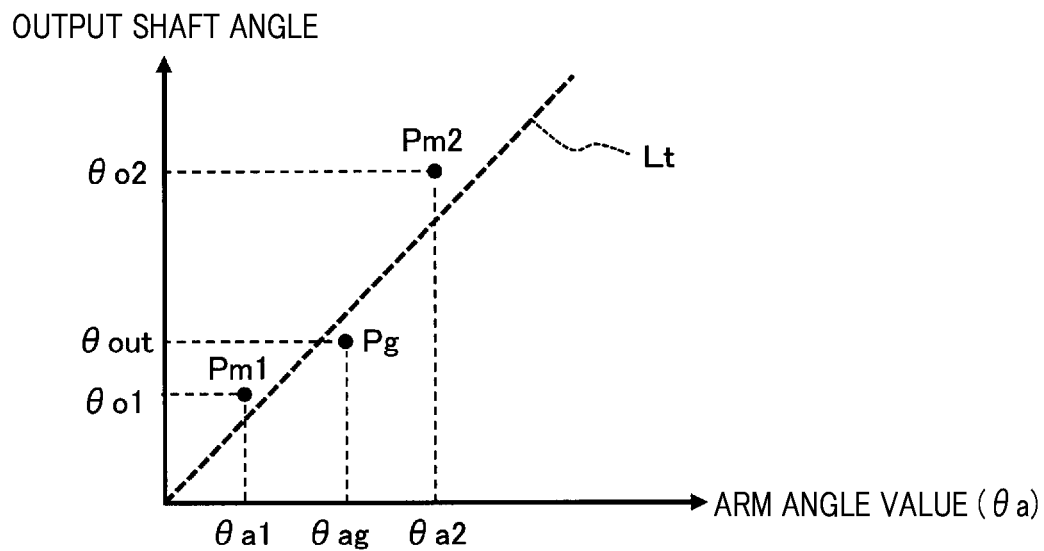
FIG. 6 is a diagram of an example of a relationship between an arm angle value and the output shaft angle.

Therefore, according to the present embodiment, as shown in FIG. 5, if the input shaft angle at the vertical position is θg, the output shaft angle (θf) when the first arm 2c is forward-rotated and reaches the vertical position and the output shaft angle (θb) when the first arm is reverse-rotated at the same speed as the forward rotation and reaches the vertical position are detected. An average value of the detected output shaft angles is used as an output shaft angle (θout) at the vertical position.

When the first arm 2c is rotated at the same speed, torsion of the same magnitude occurs during the forward rotation and the reverse rotation. Thus, a correction value can be determined in a state in which the effect of torsion is eliminated, as a result of the average of the output shaft angles during forward rotation and reverse rotation being taken. That is, at the vertical position, the force applied in the rotation direction can be substantially ignored.

Thus, a value obtained by the input shaft angle being divided by the reduction ratio of the reducer 6 can be used as the arm angle value. In addition, the displacement by an amount equivalent to backlash is in a reverse direction. Therefore, the arm angle value can be determined in a state in which the displacement by an amount equivalent to backlash is also canceled out.

In this way, the vertical position can be said to be a position at which extraction of only the eccentricity error attributed to eccentricity in the output-shaft angle detector 8 can be performed. Accuracy is slightly reduced because the output shaft angle has not yet been corrected. Here, the average value of the input shaft angles in relation to the output shaft angle that is the same during forward rotation and reverse rotation can be determined and used as the arm angle value.

After detecting the input shaft angle and the output shaft angle at each measurement position, the controller 3 determines an error curve (Le) (step S2), as shown in FIG. 3. At this time, when the output-shaft angle detector 8 is not eccentric, the output shaft angle should coincide with the arm angle value. In this case, as indicated by a virtual line (Lt) in FIG. 6, the arm angle value and the output shaft angle have a directly proportional relationship.

Conversely, when the output-shaft angle detector 8 is eccentric, the output shaft angle shifts from the virtual line (Lt) by an amount equivalent to the error that occurs due to the eccentricity. Therefore, this discrepancy can be used as the eccentricity error that occurs due to the eccentricity in the output-shaft angle detector 8. At a position at which the own arm weight affects the rotation direction, the amount of torsion in the reducer 6 cannot be estimated. Thus, the above-described idea cannot be applied. Determining the arm angle value from the input shaft angle becomes difficult.

Here, the arm angle value and the output shaft angle at each measurement position are (θa1, θo1) at the contact position (Pm1), (θa2, θo2) at the contact position (Pm2), and (θag, θout) at the vertical position (Pg).

At this time, the difference between the virtual line (Lt) and the output shaft angle is the eccentricity error, as described above. Thus, the controller 3 converts the relationship between the arm angle value and the output shaft angle shown in FIG. 6 to the relationship between the arm angle value and the eccentricity error shown in FIG. 7. Regarding the conversion, because adjustments can be made through offset (B), described hereafter, for example, the conversion can be performed in a manner in which any of the measurement positions serves as a point of origin or a zero point of a horizontal axis.

Here, the eccentricity error in the output-shaft angle detector 8 is known to be in the form of a sine wave of which a single cycle is a single rotation of the arm. A reason for this is that, when the rotational center (Jo) of the output-shaft angle detector 8 has shifted from the rotational center (J) of the first arm 2c, a detection position of the optical detector changes in accompaniment with the rotation of the first arm 2c, and returns to the same position when the first arm 2a makes a single rotation.

Figure 7:
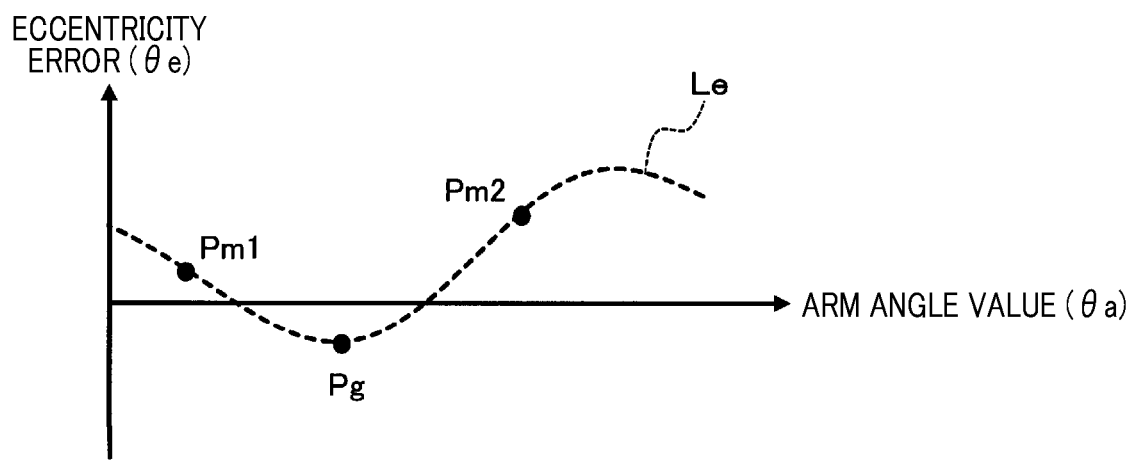
FIG. 7 is a diagram of an example of a relationship between the arm angle value and the eccentricity error.

Thus, the error curve (Le) that indicates the relationship between the arm angle value (θa) and the eccentricity error (θe) can be approximated with a sine wave that passes through each measurement position shown in FIG. 7. The error curve can be determined such as by an expression (1), below.

$$\theta e = A(\sin(\theta a + \varphi)) + B \qquad (1)$$

Here, there are three unknowns in the expression (1), that is, amplitude (A), phase (φ), and offset (B). As described above, the arm angle value (θa) and the eccentricity error (θe) at each of the three measurement positions are determined. As a result of the arm angle value (θa) and the eccentricity error (θe) at each measurement position being plugged into the expression (1), the unknowns, that is, the amplitude (A), the phase (φ), and the offset (B) can be identified. The error curve (Le) can thereby be determined.

The error curve indicates the relationship between the arm angle value (θa) and the eccentricity error (θe). Thus, to determine the eccentricity error during operation of the robot 2, the arm angle value is required to be identified from either of the detection angles that can be detected during operation. Due to the effect of the own arm weight, identifying the arm angle value based on the input shaft angle is difficult.

According to the present embodiment, the arm angle value is identified based on the output shaft angle (step S3). The eccentricity error (θe) in the expression (1) is the difference between the output shaft angle (θo) and the arm angle value (θa) when eccentricity is assumed to not be present, as described above. Thus, the relationship thereof can be expressed by an expression (2), below.

$$\theta o = \theta a + \theta e \qquad (2)$$

When the eccentricity error (θe) is eliminated from the expression (1) and the expression (2), the relationship between the output shaft angle (θe) and the arm angle value (θa) is determined as in an expression (3), below. The expression (3) corresponds to a correction formula that associates the output shaft angle and the arm angle value using the error curve.

$$\theta o = \theta a + (A(\sin(\theta a + \varphi)) + B) \qquad (3)$$

As the expression (3) clearly indicates, when the output shaft angle is detected, the arm angle value (θa) corresponding to the output shaft angle can be determined. Then, when the arm angle value (θa) is determined, the correction value for correcting the eccentricity error, that is, the error caused by the eccentricity in the output-shaft angle detector 8 can be determined based on the expression (1).

As a result, when the output shaft angle is detected during operation of the robot 2, the eccentricity error included in the detected output shaft angle can be correctly determined. In addition, as a result of the eccentricity error being used as a correction value, the eccentricity error can be accurately corrected. At a glance, from the expression (3), it appears that a plurality of candidates for the arm angle value are determined as solutions. However, in the actual robot 2, the amplitude of the eccentricity error is expected to be extremely small (negligible). Thus, in practical terms, consideration of a plurality of solutions is thought to be unnecessary.

Here, the expression (3) is non-linear. Therefore, the arm angle value (θa) is difficult to directly determine. When calculation is performed during operation of the robot 2, calculation load may increase, or processing speed may decrease.

As shown in FIG. 3, the controller 3 performs a preparation for correction (step S4). In the preparation for correction, the controller 3 performs a process such as generating a reference table or an approximation equation. The reference table enables the arm angle value (θa) or the correction value itself to be directly identified, or indirectly identified through interpolation or the like. The approximation equation approximates the expression (3) with an n-order polynomial, for example, of an extent enabling the arm angle value (θa) or the correction value itself to be determined without delay during operation of the robot 2.

That is, at step S4, the controller 3 performs a preliminary preparation for efficiently determining the correction value. The reference table can be generated by a plurality of values being determined through substitution by a dummy value, and a straight line or a curve interpolating between the values being determined. Methods other than the above-described reference table and the n-th order polynomial can be used in the preparation for correction. In addition, the arm angle value (θa) can be directly determined from the expression (3). Therefore, step S4 may be omitted. The arm angle value (θa) and the correction value can be determined based on the expression (1) and the expression (3) during operation of the robot 2.

When the preparation for correction is completed or omitted, the controller 3 mainly determines the correction value and corrects the eccentricity error during operation of the robot 2 (step S5). Specifically, for example, during operation of the robot 2, the controller 3 detects accordingly the output shaft angle that changes in accompaniment with the rotation of the first arm 2c.

Then, the controller 3 determines the arm angle value corresponding to the detected output shaft angle or the correction value itself either indirectly using the above-described reference table or n-th order polynomial, or directly using the expression (1) and the expression (3). The controller 3 then corrects the eccentricity error included in the output shaft angle using the eccentricity error corresponding to the determined arm angle value as the correction value.

In this way, according to the present embodiment, the eccentricity error that occurs due to eccentricity in the output-shaft angle detector 8 is corrected based on the eccentricity errors detected in at least three measurement positions that correspond to at least one or more of a position at which the rotation angle of the arm can be estimated based on mechanical design values, a position at which the own weight of the arm does not affect the rotation direction, and a position at which the rotation direction is expected to be substantially unaffected by the own weight of the arm.

According to the embodiment described above, the following effects can be obtained.

According to the embodiment, the output shaft angle is detected in at least three measurement positions at which the own weight of the arm does not affect the rotation direction. The difference between the arm angle value at each measurement position and the output shaft angle detected at each measurement position is determined as the eccentricity error. Then, the arm angle value and the eccentricity error at each measurement position are approximated by a sine wave of which a single cycle is a single rotation of the arm. As a result, the error curve that indicates the relationship between the arm angle value and the eccentricity error is determined. The correction formula associating the output shaft angle and the arm angle value is determined using the error curve.

Next, when the arm is rotated, the arm angle value corresponding to the detected output shaft angle is determined based on the correction formula. The eccentricity error corresponding to the determined arm angle value is determined as the correction value based on the error curve. The eccentricity error is corrected. At this time, the effect of the own weight of the arm is suppressed or eliminated from the output shaft angle that is detected at each measurement position. Therefore, should the output shaft angle and the arm angle value differ, the difference is considered to be the eccentricity error that occurs due to eccentricity in the output shaft angle detector 8.

In addition, it is known that the eccentricity error that occurs due to eccentricity in the output shaft angle detector 8 forms a sine wave of which a single cycle is a single rotation of the arm. Therefore, as a result of the arm angle value and the eccentricity error at each measurement position being approximated by the sine wave of which a single cycle is a single rotation of the arm, the error curve that indicates the relationship between the arm angle value and the eccentricity error can be determined.

At this time, the determined error curve indicates the relationship between the arm angle value and the eccentricity error. Therefore, to enable correction of the eccentricity error during operation of the robot 2, the correction formula associating the output shaft angle and the arm angle value is defined. Based on the output shaft angle detected during operation of the robot 2, the arm angle value that corresponds to the output shaft angle is determined. The eccentricity error is corrected using the correction value corresponding to the arm angle value. As a result, the eccentricity error corresponding to the arm angle value can be accurately extracted.

In this case, because the correction value is determined based on the output shaft angle that is unaffected by backlash, elastic deformation, the angle transmission error in the reducer 6, and the like, the correction value can be accurately determined. In addition, because the output shaft angle can be determined during operation of the robot 2, correction can be performed during operation of the robot 2. Consequently, the eccentricity error that occurs due to eccentricity in the angle detector can be properly corrected.

According to the embodiment, the contact position at which the arm comes into contact with the stopper 4 that mechanically restricts the rotation of the arm is set as at least one of the measurement positions. The stopper 4 is mechanically attached to the robot 2. Therefore, the position of the stopper 4 is fixed. The mechanical positional relationship between the stopper 4 and the rotational center of the arm is also prescribed. Furthermore, the stopper 4 supports the own weight of the arm side at the contact position. Therefore, the own weight of the arm side does not cause an error in the detection angle.

As a result, when the arm is at the contact position, the arm angle value can be mechanically identified based on the position of the stopper 4, the outer dimensions of the arm, and the like. Consequently, as a result of the contact position being set as the measurement position, extraction of only the eccentricity error attributed to eccentricity in the output shaft angle detector 8 can be performed.

According to the embodiment, the vertical position at which the center of gravity on the arm side is positioned within a range that includes a vertically upward direction from the rotational center of the arm is set as at least one of the measurement positions. When the arm is positioned in the vertical position, force in the rotation direction is not applied to the reducer 6. Therefore, the reducer 6 is in a state in which elastic deformation does not occur, or is negligible because the force applied in the rotation direction is minimal.

As a result, at the vertical position, the input shaft and the output shaft are considered to be in a substantially coinciding state. In this case, it is thought that the arm angle value can be determined with high accuracy from the detected input shaft angle. Consequently, as a result of the vertical position being set as the measurement position, extraction of only the eccentricity error caused by eccentricity in the output shaft angle detector 8 can be performed. In addition, at the vertical position, for example, because the arm is oriented in the substantially vertical direction when the arm is extended straight, the arm angle value can also be mechanically identified According to the embodiment, an average value of the output shaft angle at the vertical position detected when the arm is forward-rotated and the output shaft angle at the vertical position when the arm is reverse-rotated at the same speed as the forward rotation is set as the output shaft angle at the vertical position. When the arm is rotated at the same speed, torsion of the same magnitude occurs during forward rotation and reverse rotation. Therefore, as a result of the average of the output shaft angles during forward rotation and reverse rotation being set as the output shaft angle, the correction value corresponding to the output shaft angle from which the effect of torsion has been eliminated can be determined. Accuracy of the correction value can be improved.

The robot system 1 that includes the control unit 3a that performs the above-described processes is also capable of achieving similar effects. In addition, in the actual robot 2, the position of the stopper 4 is not often made minutely variable. Therefore, the attitudes at which the own arm weight has no effect are realistically limited. Thus, realistic application to the actual robot 2 can be obtained by the eccentricity errors at the three measurement positions being determined, and the error curve being generated based on the characteristic in that the eccentricity error exhibits changes that are approximate to the sine wave.

The eccentricity error in the output shaft angle detector 8 can be determined after assembly of the robot 2 is completed, or in other words, after the joint in the robot 2 is in a state of receiving the own weight of the arm. However, in the above-described method, the error curve can be determined and the correction value can be determined regarding the robot 2 of which assembly has been completed. Therefore, there is an advantage in that the method can be realistically used at the manufacturing site of the robot 2. In addition, the error curve can be determined and the correction value can be determined at the installation site of the robot 2, as well. Therefore, the method of the present disclosure is very convenient.

Second Embodiment

A second embodiment will be described below with reference to FIG. 8 to FIG. 10. According to the second embodiment, several methods that are effective for the actual robot 2 will be described. However, the configuration of the robot 2 and the flow of processes are identical to those according to the first embodiment. Therefore, the description will be given also with reference to FIG. 1 to FIG. 7, as required. In addition, hereafter, two methods for improving detection accuracy of the output shaft angle at the vertical position and a single method for increasing contact positions and improving accuracy will be separately described.

<Method 1 for Improving the Detection Accuracy of the Output Shaft Angle at the Vertical Position>

As described according to the above-described first embodiment, the strain wave gearing may be used as the reducer 6 in the robot 2. It is known that angle transmission errors markedly occur during actual driving of the strain wave gearing. Here, the angle transmission error is an error that occurs as a result of the output shaft angle determined by the input shaft angle being divided by the reduction ratio of the reducer 6 differing from a theoretical value. It is known that the angular transmission error occurs at frequencies that are integral multiples of the reduction ratio, in relation to a single rotation on the output shaft side.

Figure 8:
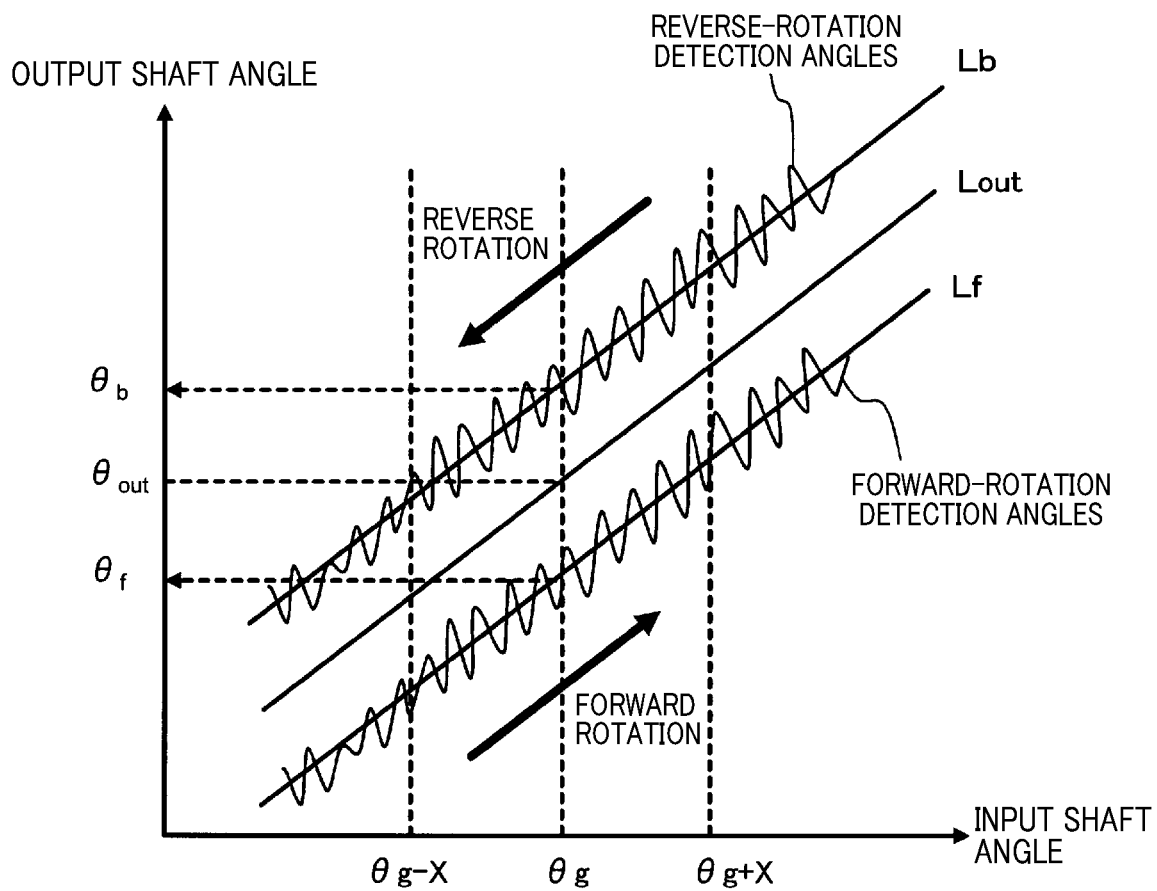
FIG. 8 is a diagram (1) of an example of a method for determining an output shaft angle including an angle transmission error according to a second embodiment.

Therefore, when the input shaft angle is controlled in the vicinity of the vertical position at which the center of gravity of the arm is on the vertical line (Lv), and forward rotation and reverse rotation are performed at a fixed speed, as shown in FIG. 8, fine vibrations are superimposed on the output shaft angle as a result of the angular transmission error, in addition to the output shaft being pulled by the input shaft. In FIG. 8, an example of the output shaft angle that is detected in a state in which the angular transmission error is superimposed during forward rotation is shown as a forward-rotation detection angle. An example of the output shaft angle that is detected in a state in which the angular transmission error is superimposed during reverse rotation is shown as a reverse-rotation detection angle.

Therefore, even when the arm is forward-rotated, as a result of the angle transmission error, a differing value may be detected as the output shaft angle detected at the vertical position at which the input shaft angle is $\theta g$. This also similarly applies when the arm is reverse-rotated. As a result, when the output shaft angle is detected by the arm being forward-rotated or reverse-rotated in the vicinity of the vertical position, a discrepancy of an amount equivalent to the angular transmission error occurs. The accuracy of the correction value may decrease.

Therefore, according to the present embodiment, a forward-rotation approximation line (Lf) and a reverse-rotation approximation line (Lb) are determined. The forward-rotation approximation line (Lf) approximates the relationship between forward-rotation detection angles, that is, a plurality of input shaft angles and output shaft angles detected when the arm is forward-rotated. The reverse-rotation approximation line (Lb) approximates the relationship between reverse-rotation detection angles, that is, a plurality of input shaft angles and output shaft angles detected when the arm is reverse-rotated at the same speed as the forward rotation.

An average value of the output shaft angle ($\theta f$) at the vertical position (input shaft angle=$\theta g$) determined from the forward-rotation approximation line (Lf) and the output shaft angle ($\theta b$) at the vertical position determined from the reverse-rotation approximation line (Lb) may be set as the output shaft angle ($\theta out$) at the vertical position. Alternatively, an average-value approximation line (Lout) that is the average of the forward-rotation approximation line (Lf) and the reverse-rotation approximation line (Lb) may be determined. A value on the average-value approximation line (Lout) at the vertical position may be set as the output shaft angle ($\theta out$).

As a result of the output shaft angle being determined based on the forward-rotation approximation line (Lf) and the reverse-rotation approximation line (Lb) in this manner, the effect of the angular transmission error can be suppressed.

At this time, for example, a range of the vicinity of the vertical position for determining the approximation lines may be set at an angular range that is, for example, $\theta g - X \leq$ range of vicinity $\leq \theta g + X$ based on the input shaft angle.

In this case, when X is too small, the effect of angular transmission error on the approximation line itself is large. The advantageous effects of using the approximation lines are not obtained. Therefore, X is required to be set so as to be at least equal to or greater than an angle obtained by a single rotation of the arm being divided by the reduction ratio. Conversely, when X is too large, the effect of eccentricity becomes significant.

Therefore, the magnitude of X is preferably set in a well-balanced manner, taking into consideration the effects of the angular transmission error and the effects of eccentricity. In this case, the angular range ($\alpha$) that serves as the vertical position, described according to the first embodiment, can also be set as the range of the vicinity of the vertical position. In addition, regarding the approximation lines, approximation may be performed with a curve instead of a straight line.

<Method 2 for Improving the Detection Accuracy of the Output Shaft Angle at the Vertical Position>

As described above, when the strain wave gearing is used as the reducer 6, a discrepancy may occur in the detection value of the output shaft angle as a result of the angular transmission error. In addition, even should the arm be forward-rotated and reverse-rotated at a fixed speed, discrepancy caused by the output shaft being pulled by the input shaft may occur.

Figure 9:
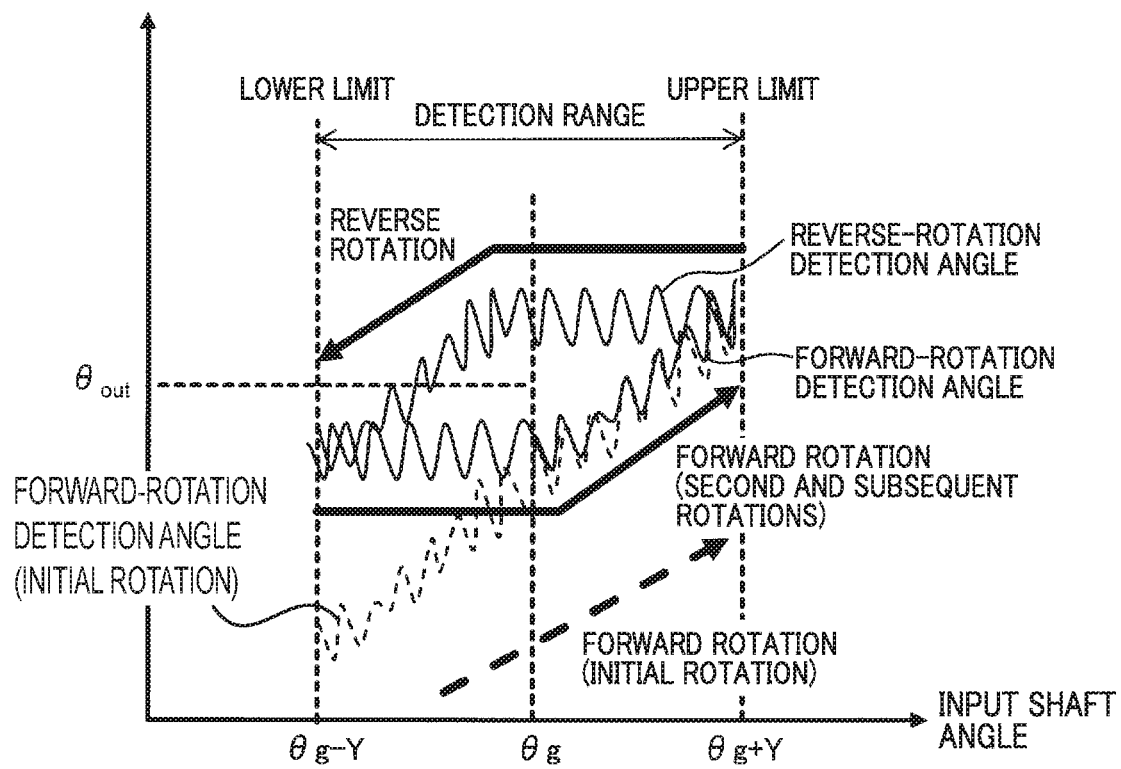
FIG. 9 is a diagram (2) of an example of a method for determining an output shaft angle including an angle transmission error according to the second embodiment.

In addition, when forward rotation and reverse rotation are repeated within the detection range set in the vicinity of the vertical position, as shown in FIG. 9, when the arm reaches an upper limit or a lower limit of the detection range and the rotation direction is reversed, the output shaft exhibit behavior in which the output shaft stops as a result of friction until the torsion with the input shaft becomes the opposite direction. Then, when the torsion changes direction, the output shaft is pulled by the input shaft and starts to move.

Therefore, as a result of forward rotation and reverse rotation between the upper limit and the lower limit of the detection range being repeated several times and an average value of the output shaft angles determined at this time being taken, the output shaft angle at a center position on the trajectory of the output shaft angle that forms a substantially rhombic shape in FIG. 9, that is, the vertical position can be determined.

However, when the arm that is stopped is initially rotated to the upper limit or the lower limit of the detection range, as shown in FIG. 9, the behavior during this initial operation differs from that described above. Therefore, to increase accuracy, the output shaft angle acquired during the initial rotation is preferably excluded.

Here, after the arm is temporarily rotated to either of the upper limit and the lower limit of the detection range, a process for detecting the output shaft angle at each predetermined angle while rotating the arm from the upper limit to the lower limit and a process for detecting the output shaft angle at each predetermined angle while rotating the arm from the lower limit to the upper limit at the same speed are performed the same number of times. An average value of the plurality of output shaft angles detected in the processes is set as the output shaft angle at the vertical position. As a result, the output shaft angle can be determined in a state in which the effect of the angular transmission error is suppressed.

<Method for Improving Accuracy by Increasing Measurement Positions>

An example in which the stoppers 4 are provided on the forward-rotation side and the reverse-rotation side of the vertical position in the robot 2 according to the first embodiment is given. However, cases in which the arm cannot be rotated to the vertical position depending on usage mode of the robot 2 can also be assumed.

Figure 10:
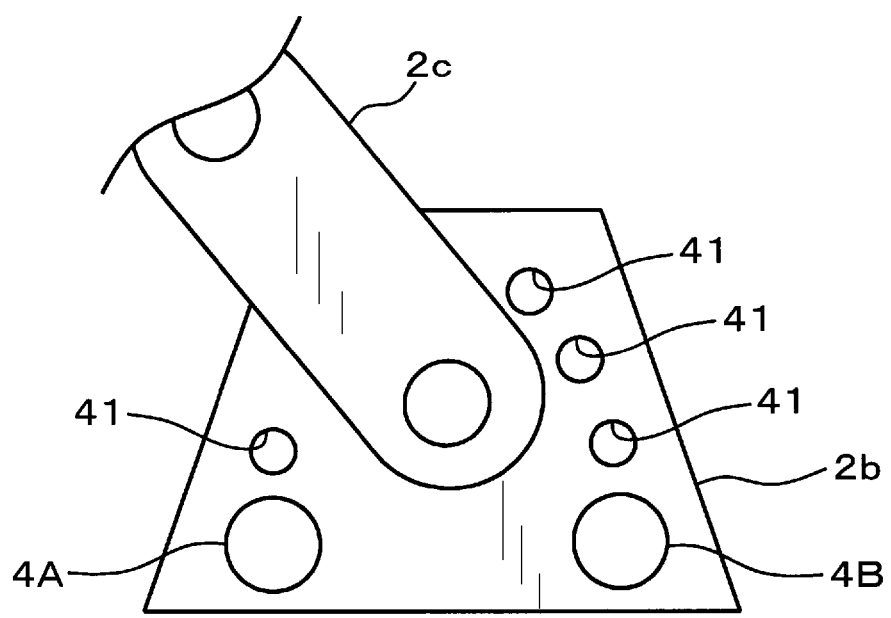
FIG. 10 is a diagram schematically showing an example of a configuration for increasing contact positions.

Therefore, as shown in FIG. 10, for example, a plurality of tapped attachment holes 41 are provided in the robot 2. The stoppers 4 are attached to the attachment holes 41 as jigs. As a result, the robot 2 can be configured such that the number of contact positions at which the own arm weight has no effect can be increased.

Consequently, because the number of contact positions are increased, at least three contact positions can be set even in cases in which the stoppers 4 are set in positions that do not sandwich the vertical position or the arm cannot be rotated to the vertical position.

The positions of the attachment holes 41 are mechanically determined. Therefore, a correct arm angle value can be determined at the contact position at which the arm comes into contact with the stopper 4. In this case, the stopper 4 that is attached to the attachment hole 41 is merely required to be attached only when the process for determining the error curve is performed. As a result of the stopper 4 being subsequently removed, interference by the stopper 4 during operation of the robot 2 can be prevented. The stoppers 4 that restrict the range of movement of the arm can remain attached as is.

Furthermore, as a result of four or more contact positions being provided, the error curve can be determined in a state in which the effects of measurement errors are further suppressed. The correction value can be more accurately determined. In this case, it goes without saying that the vertical position can also be used.

The robot system 1 that includes the control unit 3a that performs the above-described processes is also capable of achieving similar effects.

Third Embodiment

A third embodiment will be described below. According to the third embodiment, a method for simplifying the calculation for determining the correction value will be described.

The following method is described according to the first embodiment. That is, the arm angle value ($\theta a$) corresponding to the output shaft angle ($\theta o$) is determined using the expression (3). Then, the correction value at the determined arm angle value ($\theta a$) is determined from the expression (1). However, as described above, the calculation is difficult when the arm angle value ($\theta a$) is directly determined from the expression (3). Increase in calculation load becomes a concern.

Therefore, according to the present embodiment, a function of the arm angle value included in the correction formula, that is, the second term on the right side of the expression (3) that is indicated below as being an error term is approximated with an arm angle that is obtained by the input shaft angle being divided by the reduction ratio of the reducer 6. The calculation is thereby simplified. Hereafter, the second term on the right side of the expression (3), below, is referred to as the error term for convenience.

$A(\sin(\theta a+\varphi))+B$ (error term)

Specifically, the arm angle value ($\theta a$) included in the error term is set to an arm angle ($\theta ai$) that is obtained by the input shaft angle ($\theta i$) being divided by the reduction ratio of the reducer 6. As a result, the error term is approximated such as in an approximation term, below.

$A(\sin(\theta ai+\varphi))+B$ (approximation term)

Then, the expression (3) is approximated such as in an expression (4) below, using the approximation term.

$\theta o=\theta a+A(\sin(\theta ai+\varphi))+B$ (4)

In the case of this expression (4), whereas the calculation should originally be performed using the arm angle value ($\theta a$), approximation is performed using the arm angle ($\theta ai$). Therefore, depending on the rotation angle of the arm, the inclusion of error caused by the effect of the own arm weight is likely to occur. A slight error may occur even in the arm angle value ($\theta a$) that is ultimately determined.

However, although the eccentricity error changes in the form of the sine wave of which a single cycle is a single rotation of the arm, in the actual robot 2, the difference between the arm angle value ($\theta a$) and the arm angle ($\theta ai$) is very small. The right side in the expression (3) and the right side in the expression (4) can be considered substantially equal. Therefore, even when the arm angle ($\theta ai$) is used as in the expression (4), the eccentricity error can be corrected with accuracy of an extent substantially similar to that of expression (3).

That is, when the correction value is determined, the arm angle value ($\theta a$) is approximated with the arm angle ($\theta ai$) obtained by the input shaft angle being divided by the reduction ratio of the reducer 6. As a result, as shown in the expression (4), the arm angle value ($\theta a$) can be determined by the four basic arithmetic operations and the trigonometric function. Therefore, calculation load can be significantly reduced.

The robot system 1 that includes the control unit 3a that performs the above-described processes is also capable of achieving similar effects.

Other Embodiments

The present disclosure is not limited only to the configurations given as examples according to the above-described embodiments. Various modifications, expansions, and combinations are possible without departing from the spirit of the invention.

According to the embodiments, an example in which the controller 3 performs the processes shown in FIG. 3 is given. However, the processes at steps S1 to S4 can be performed by a teaching pendant or a high-order control apparatus (not shown).

An example in which correction is performed using the contact positions and the vertical position is given according to the first embodiment. However, because the center of gravity (G) of the own arm weight changes depending on the attitude of the robot 2, for example, it can be considered that a plurality of vertical positions of which the input shaft angles differ may be present, such as in a state in which the arm of the robot 2 is symmetrical in relation to the vertical line (Lv) in FIG. 3. In addition, as described according to the second embodiment, a plurality of contact positions may also be provided.

Therefore, correction can be performing using a single contact position and two vertical positions. Alternatively, correction can be performed using a plurality of contact positions and a plurality of vertical positions. Furthermore, correction can be performed using only three or more contact positions or only three or more vertical positions.

The contact position according to the embodiments is also a position at which the arm angle value can be mechanically determined. However, because the stopper 4 supports the own arm weight, the contact position is also a position at which force in the rotation direction is not applied to the reducer 6 and displacement by an amount equivalent to elastic deformation does not occur. Therefore, for example, should elastic deformation not occur on the side onto which the arm is pressed, such as when the arm is manually rotated in placed at the contact position, it can be considered that torsion between the input shaft and the output shaft does not occur, or the torsion is minimal. Therefore, the arm angle value at each measurement position can also be determined from the input shaft angle.

What is claimed is:

1. An eccentricity error correction method for an angle detector in a robot system that includes a motor, an arm that is connected to an output shaft side of the motor via a reducer, an input shaft angle detector that detects a rotation angle of the motor as an input shaft angle, and an output shaft angle detector that detects a rotation angle of the arm as an output shaft angle, the eccentricity error correction method correcting eccentricity error that occurs due to eccentricity in the output shaft angle detector, the eccentricity error correction method comprising:
  detecting the output shaft angle in at least three measurement positions at which an effect of an own weight of the arm on a rotation direction is suppressed;
  determining a difference between an arm angle value at each measurement position and the output shaft angle detected at each measurement position as an eccentricity error;
  determining an error curve as a function of the arm angle value by approximating the eccentricity error at each measurement position with a sine wave of which a single cycle is a single rotation of the arm, the error curve indicating a relationship between the arm angle value and the eccentricity error;
  determining a correction formula that associates the output shaft angle and the arm angle value using the error curve; and
  determining a correction value corresponding to the detected output shaft angle based on the correction formula and correcting the eccentricity error when the arm is rotated.

2. The eccentricity error correction method for an angle detector according to claim 1, wherein:
  a contact position at which the arm comes into contact with a stopper from above is set as at least one of the measurement positions, the stopper mechanically restricting the rotation of the arm.

3. The eccentricity error correction method for an angle detector according to claim 1, wherein:
  a vertical position is set as at least one of the measurement positions, the vertical position being a position at which a center of gravity on the arm side is positioned within a predetermined angular range that includes a vertically upward direction from a rotational center of the arm.

4. The eccentricity error correction method for an angle detector according to claim 3, wherein:
  an average value of the output shaft angle at the vertical position detected when the arm is forward-rotated and the output shaft angle at the vertical position detected when the arm is reverse-rotated at a same speed as the forward rotation is set as the output shaft angle at the vertical position.

5. The eccentricity error correction method for an angle detector according to claim 3, wherein:
  a forward-rotation approximation line approximating a relationship between a plurality of input shaft angles and output shaft angles detected when the arm is forward-rotated and a reverse-rotation approximation line approximating a relationship between a plurality of input shaft angles and output shaft angles detected when the arm is reverse-rotated at a same speed as the forward rotation are determined; and
  an average value of an output shaft angle at the vertical position determined from the forward-rotation approximation line and an output shaft angle at the vertical position determined from the reverse-rotation approximation line is set as the output shaft angle at the vertical position.

6. The eccentricity error correction method for an angle detector according to claim 3, wherein:
  a predetermined detection area of which a center is vertically above the rotational center of the arm is set;
  after the arm is temporarily rotated to either of an upper limit and a lower limit of the detection range, a process for detecting the output shaft angle at each predetermined angle while rotating the arm from the upper limit to the lower limit and a process for detecting the output shaft angle at each predetermined angle while rotating the arm from the lower limit to the upper limit are performed a same number of times; and
  an average value of the plurality of output shaft angles detected in the processes is set as the output shaft angle at the vertical position.

7. The eccentricity error correction method for an angle detector according to claim 1, wherein:
  a function of the arm angle value included in the correction formula is approximated with an arm angle obtained by the input shaft angle being divided by a reduction ratio of the reducer.

8. The eccentricity error correction method for an angle detector according to claim 1, wherein:
  the correction formula is expressed by $$\theta o = \theta a + A(\sin(\theta a + \varphi)) + B$$

where $\theta o$ is the output shaft angle, $\theta a$ is the arm angle value, A is an amplitude of the error curve, $\varphi$ is a phase of the error curve, and B is an offset of the error curve.

9. The eccentricity error correction method for an angle detector according to claim 1, wherein:
  the correction formula is expressed by $$\theta o = \theta a + A(\sin(\theta ai + \varphi)) + B$$

where $\theta o$ is the output shaft angle, $\theta a$ is the arm angle value, $\theta ai$ is an arm angle that is obtained by the input shaft angle being divided by a reduction ratio of the reducer, A is an amplitude of the error curve, $\varphi$ is a phase of the error curve, and B is an offset of the error curve.

10. A robot system comprising:
  a motor;
  an arm that is connected to an output shaft side of the motor via a reducer;
  an input shaft angle detector that detects a rotation angle of the motor as an input shaft angle;
  an output shaft angle detector that detects a rotation angle of the arm as an output shaft angle; and
  a control unit that
    detects the output shaft angle in at least three measurement positions at which an own weight of the arm does not affect a rotation direction,
    determines a difference between an arm angle value at each measurement position and the output shaft angle detected at each measurement position as an eccentricity error;
    determines an error curve that indicates a relationship between the arm angle value and the eccentricity error by approximating the eccentricity error at each measurement position with a sine wave of which a single cycle is a single rotation of the arm,
    determines a correction formula that associates the output shaft angle and the arm angle value using the error curve; and
    determines a correction value corresponding to the detected output shaft angle based on the correction formula and corrects the eccentricity error when the arm is rotated.

* * * * *